United States Patent
Boggs

(10) Patent No.: US 9,512,756 B2
(45) Date of Patent: Dec. 6, 2016

(54) PROPORTIONAL HEATER CONTROL FOR DIESEL EMISSION SYSTEM FOR MARINE POWERED GENERATOR SET

(71) Applicant: Richard Boggs, Fort Lauderdale, FL (US)

(72) Inventor: Richard Boggs, Fort Lauderdale, FL (US)

( * ) Notice: Subject to any disclaimer, the term of this patent is extended or adjusted under 35 U.S.C. 154(b) by 0 days.

(21) Appl. No.: 14/253,972

(22) Filed: Apr. 16, 2014

(65) Prior Publication Data

US 2014/0318108 A1    Oct. 30, 2014

Related U.S. Application Data

(60) Provisional application No. 61/955,572, filed on Mar. 19, 2014, provisional application No. 61/815,437, filed on Apr. 24, 2013.

(51) Int. Cl.

| | | |
|---|---|---|
| *F01N 3/00* | (2006.01) | |
| *F01N 3/10* | (2006.01) | |
| *F01N 3/02* | (2006.01) | |
| *F01N 3/027* | (2006.01) | |
| *F01N 3/033* | (2006.01) | |
| *F01N 13/00* | (2010.01) | |
| *F01N 3/035* | (2006.01) | |
| *F01N 9/00* | (2006.01) | |

(52) U.S. Cl.
CPC .............. *F01N 3/027* (2013.01); *F01N 3/033* (2013.01); *F01N 3/035* (2013.01); *F01N 9/002* (2013.01); *F01N 13/0097* (2014.06); *F01N 9/007* (2013.01); *F01N 2240/16* (2013.01); *F01N 2560/06* (2013.01); *F01N 2570/04* (2013.01); *F01N 2590/02* (2013.01); *F01N 2900/0416* (2013.01); *F01N 2900/1404* (2013.01); *F01N 2900/1602* (2013.01); *Y02T 10/47* (2013.01)

(58) Field of Classification Search
CPC .......... F01N 13/0097; F01N 2240/16; F01N 2560/06; F01N 2570/04; F01N 2590/02; F01N 2900/0416; F01N 2900/1404; F01N 2900/1602; F01N 3/027; F01N 3/033; F01N 9/002; F01N 9/007; Y02T 10/20; Y02T 10/47
USPC ........................ 60/295, 297, 300, 303, 311
See application file for complete search history.

(56) References Cited

U.S. PATENT DOCUMENTS

| | | | | |
|---|---|---|---|---|
| 6,694,727 | B1 * | 2/2004 | Crawley et al. ................ | 60/295 |
| 8,650,860 | B2 * | 2/2014 | Applegate et al. ............ | 60/295 |
| 8,844,270 | B2 * | 9/2014 | Wagner ................ | F01N 3/0238 |
| | | | | 55/282.3 |

(Continued)

FOREIGN PATENT DOCUMENTS

JP     07011936    *  1/1995

OTHER PUBLICATIONS

Diesel Fuel Grades, http://www.dieselnet.com/standards/us/fuel.php.

*Primary Examiner* — Thomas Denion
*Assistant Examiner* — Diem Tran
(74) *Attorney, Agent, or Firm* — Robert C. Kain, Jr.

(57) ABSTRACT

A proportional heater controls a marine diesel powered generator with a diesel particulate filter (DPF). A proportional control is applied to the heater based upon exhaust temperature. The heater heats exhaust gas to a regeneration temperature to remove soot and sulphur from the processed gas when the diesel fuel has a sulphur content exceeding 1,000 ppm. The heater is supplied power via SCRs to reduce electromagnetic and radio frequency interference. A manual override permits the operator to set a temperature setpoint, force the heater to meet a certain temperature and establish a load bank for diesel engine electrical generator set.

20 Claims, 3 Drawing Sheets

(56) References Cited

U.S. PATENT DOCUMENTS

2010/0186373 A1* 7/2010 Pierz .................. F01N 3/027
  60/274

2010/0319331 A1* 12/2010 Wagner .................. F01N 3/0238
  60/311

2011/0131951 A1* 6/2011 Arrigoni et al. ................ 60/274

* cited by examiner

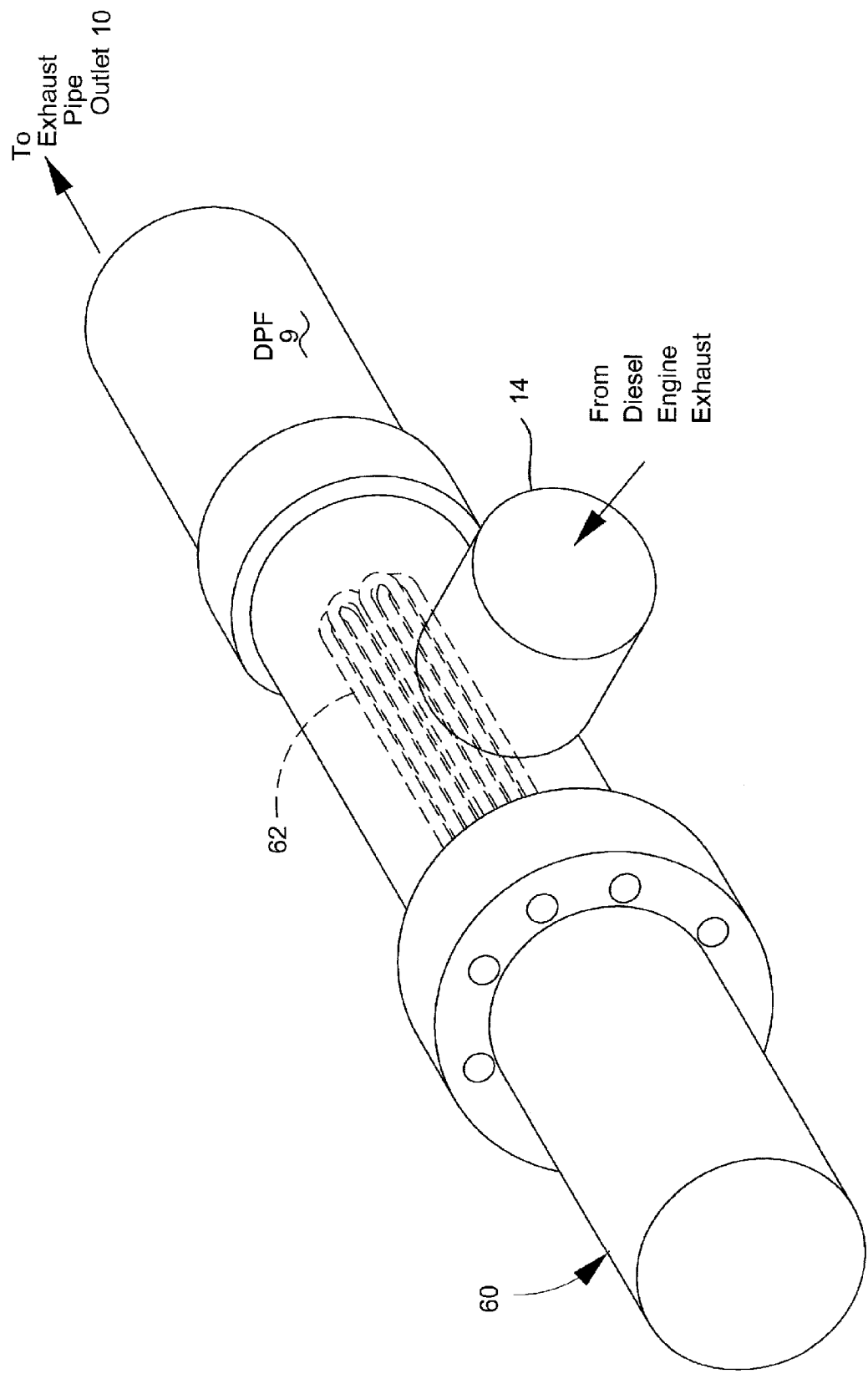

PROPORTIONAL HEATER CONTROL FOR DIESEL EMISSION SYSTEM FOR MARINE POWERED GENERATOR SET

This is a regular patent application claiming the benefit of priority of provisional patent application Ser. No. 61/815,437 filed Apr. 24, 2013 and provisional patent application Ser. No. 61/955,572 filed Mar. 19, 2014, the contents thereof is incorporated herein by reference thereto.

The invention provides a safe, reliable automated system including a controller for automatically regulating the temperature of exhaust from a marine diesel internal combustion engine prior to processing the exhaust gas by an exhaust emissions treatment system which includes particulate filtering, all prior to discharge of the gas into the atmosphere. The invention has particular applicability to marine vessels which utilize internal combustion engines fueled by liquid petroleum or biofuels. In the instance of marine vessels which utilize compression ignition (diesel) engines for propulsion or electrical generation, it is common for those engines to discharge high levels of unburned hydrocarbons and particulate matter, namely sulphur, into the atmosphere and surrounding aquatic environment.

BACKGROUND OF THE INVENTION

Regulation of sulphur and particulate emissions for marine engines has increased during the last 5 or so years. Marine engines use a diesel fuel which can be high in sulphur. When large marine vessels dock, it is common for the bilge pump to be ON and low level lighting to be ON. These devices will drain the battery of the marine vessel unless the diesel powered generator set is operating to supply this low level of power to the vessel. Under these conditions, the diesel marine engines are run at very low rpms. At low rpms, the diesel engines emit more particulate and greater amounts of sulphur.

When docked, the engines of these large marine vessels or yachts operate in an idle mode to maintain bilge pump operation and low light operations. In these low load conditions, the engine emits black carbon soot, unburned diesel fuel and causes a floating oil slick. Local marina regulations seek to eliminate these unwanted discharges.

Typically, land-based diesel powered generator sets use a diesel particulate filter or "DPF" to reduce sulphur and particulate emissions. However, government regulations have forced all land-based users of diesel powered machines to use low sulphur diesel fuel.

Governmental regulations for marine diesel fuel have not been fully implemented in a similar manner as compared to land-based diesel fuels, but proposed regulations do require lower sulphur marine fuels and/or specify that the diesel engine emissions from marine vessels be treated to reduce particulate and sulphur emissions prior to dispersing the exhaust gas to the atmosphere.

For operators of yachts and similar marine vessels, there are limited choices to treat diesel exhaust gas to reduce particulate and sulphur emissions.

Halyard of Dorset, U.K. makes a marine diesel particulate filter or "DPF" filter which is either turned ON manually or turned OFF manually or is subject to a programmable ON-OFF timer (a timer completely independent of engine-generator set performance).

HUG Engineering AG of Elsau, Switzerland has a marine diesel DPF system with an integral filter. The HUG system has a number of DPF filters in parallel, each with an integral heater. Diesel exhaust gas is fed into one of the parallel DPF filters (via a distribution manifold between the DPF system and the engine exhaust), but the heater is OFF in that DPF filter currently in use. A different DPF filter is selected when the filter currently in use becomes "dirty" or clogged with diesel particulate. When the in-use DPF filter is dirty-clogged, the HUG system changes the exhaust gas pathway to another in-parallel DPF filter. The heater in the dirty or clogged DPF filter is then turned ON to facilitate regeneration. The HUG system activates the filter heater for the dirty DPF filter when (a) the filter is not in use and (b) another DPF filter, in parallel to the dirty DPF filter, is currently in use. Therefore, the HUG system is an off-line regeneration system.

Existing art includes the use of porous ceramic filters which may or may not be coated with a catalyst to promote localized combustion of unburned fuel fractions and carbonaceous soot. Depending on the presence and content of a catalyst, the temperature at which combustion (known as regeneration) occurs may not be reached due to low exhaust temperature related to low engine loading.

The rate and amount of electrical power consumption on large yachts and other motor vessels is highly variable. This characteristic, in addition to the widely used practice of using a vessel's electrical generator prime mover as a source of power to drive a hydraulic pump, often leads to extended operation of the generator at low loads. Low loading of diesel powered generators creates a condition whereby poor combustion produces very high levels of exhaust emissions and the potential for accelerated wear of cylinder liners and piston rings.

The combination of those factors contributes to excessive soot production and the release of unburned hydrocarbons into the atmosphere and the water surrounding the vessel. While marine vessels are largely unregulated (at this time) with regard to diesel exhaust emissions, the practical impact of exhaust soot on the environment and the vessel's paintwork is unacceptable and is increasingly leading to restrictions being imposed on vessels that create a nuisance to their marina neighbors.

Following the lead of automotive exhaust emissions remediation techniques, marine exhaust system manufacturers have developed and are installing diesel particulate filters (DPF) in the exhaust path to capture and oxidize soot and unburned hydrocarbons prior to their release into the atmosphere. However, because the operational envelope of the marine vessel leads to underloading and hence to the problems described above, DPF systems often fail due to lack of regeneration and dogging. DPFs remove soot by trapping particles within a ceramic or metallic matrix that is coated with a catalyst to promote combustion of soot particles and unburned hydrocarbons.

In order to begin combustion in a process known as regeneration the exhaust gases must reach a certain temperature. A diesel engine used to power a generator will normally produce exhaust gases at sufficient temperature when loaded at or near rated power output and the DPF will function effectively. However, when generator loads are insufficient to produce exhaust flow at the required temperature, regeneration may not occur and filter clogging will quickly result. Filter clogging results in excessive exhaust back pressure, reduced output power, and may lead to serious engine damage.

DPF filters made by DCL International Inc. of Concord, Ontario, Canada regenerate and burn the diesel particulate for low sulphur diesel fuel, namely, fuel with less than 15 ppm sulphur. The DCL filters are not useful for marine diesel fuel which typically has 1500 ppm sulphur.

Diesel Fuel Specifications: From www-DieselNet.com, the diesel fuel regulations for the U.S. specify that No. 1-D S5000 has up to 5000 ppm sulphur, the same as No. 2-D S5000. An ASTM standard (D2069) once existed for marine diesel fuels, but it has been withdrawn. It was technically equivalent to ISO 8217. While some marine diesel engines use No. 2 distillate, D2069 covered four kinds of marine distillate fuels: DMX, DMA, DMB, and DMC and residual fuels (see also ISO marine fuel specifications). DMB (marine diesel oil, MDO) is allowed to have traces of residual fuel, which can be high in sulfur. This contamination with residual fuel usually occurs in the distribution process, when using the same supply means (e.g., pipelines, supply vessels) that are used for residual fuel. DMB is produced when fuels such as DMA are brought on board the vessel in this manner. DMB is typically used for Category 2 (5-30 liters per cylinder) and Category 3 (greater than 30 liters per cylinder) engines. DMC is a grade that may contain residual fuel, and is often a residual fuel blend. It is similar to No. 4-D, and can be used in Category 2 and Category 3 marine diesel engines.

Highway diesel fuel in 1993 was capped at 500 ppm sulphur and then in 2006 the sulphur content was reduced by regulation to 15 ppm.

Nonroad Diesel Fuel: The following sulfur requirements are applicable to Nonroad, Locomotive and Marine (NRLM) fuels, with the exception of heavy fuel oils (HFO) used in Category 2 and Category 3 marine diesel engines. 500 ppm: Sulfur limit of 500 ppm became effective in June 2007 for nonroad, locomotive and marine fuels. 15 ppm: Sulfur limit of 15 ppm (ULSD) becomes effective in June 2010 for nonroad fuel, and in June 2012 for locomotive and marine fuels. ULSD has been legislated for nonroad engines to enable advanced emission control systems for meeting the Tier 4 nonroad emission standards.

Category 3 Marine Engine Fuel: The United States and Canada applied to the IMO to establish an emission control area (ECA) along their shorelines. Once the ECA is established, it will trigger international and US EPA sulfur limits in marine fuels: International IMO limits applicable in ECAs are 1% (10,000 ppm) sulfur beginning in 2010, and 0.1% (1,000 ppm) sulfur from 2015. SOx aftertreatment, such as SOx scrubbers, are allowed in lieu of low sulfur fuel.

US EPA 2009 EPA Category 3 marine engine rule established a sulfur limit of 1,000 ppm for marine fuels produced and/or sold for use within an ECA. SOx aftertreatment can be used in lieu of low sulfur fuel. Additional flexibilities apply to vessels operated on the Great Lakes and Saint Lawrence Seaway: the low sulfur requirements can be deferred—subject to fuel availability and economic hardship provisions—and are not applicable to steamships.

OBJECT OF THE INVENTION

It is an object of the present invention to provide a method by which the exhaust temperature of a marine diesel generator set may be maintained at the level required to initiate and maintain regeneration of exhaust gas at low engine loads.

It is another object of the present invention to provide a method by which the power required to maintain exhaust temperature at the level required to initiate filter regeneration may be varied in proportion to the temperature of the exhaust gases entering the system.

It is an object of the present invention to provide a safe, reliable, and accurate means to reduce or eliminate harmful or damaging engine exhaust emissions through the application of excess available electrical power in order to maintain particulate filter function at engine loading levels below that required to initiate particulate filter regeneration.

It is another object of the present invention to account for operational parameters particular to a particular engine and installation with control system limits determined by the system elements and further controlled by the user with minimal operator input required.

It is an additional object of the present invention to provide a continuous recording of system operating parameters is provided for troubleshooting and verification purposes.

It is an object of the present invention to maintain a desired level of exhaust gas temperature entering the post treatment system.

It is another object of the present invention to provide a particulate filter that functions properly across the widest range of engine operating conditions.

It is an additional object of the present invention to allow configuration of the heater and controller as a smoothly variable electrical load for the purpose of obtaining adequate generator loading. Power consumed in the load bank configuration is dissipated by the exhaust gases. Current state of the art requires the use of liquid coolants and circulating pumps, and requires the switching of large electrical loads.

It is another object of the present invention to automate the exhaust treatment process so as to eliminate the requirement for the system operator to measure or calculate any variable in the process or to manually adjust system parameters.

SUMMARY OF THE INVENTION

The present invention provides a method and a system by which the power required to maintain exhaust temperature at the level required to initiate filter regeneration may be varied in proportion to the temperature of the exhaust gases entering the system. Low entering temperature initiates an increase in electrical power delivered to the resistance heating component of the system. As exhaust temperature is increased due to increased engine loading, the amount of electrical power required to raise the temperature of gas at the filter inlet decreases. At an operator defined level, power delivered to the heater is reduced to zero and the heating component of the system no longer utilizes electrical power that may be required by other consumers on the electrical distribution system. At that point, the heating function of the exhaust treatment system does not represent a parasitic load and all generated power is available elsewhere.

The invention also provides a method and a system to ensure exhaust gas entering the exhaust treatment device, which incorporates a DPF emissions filter, is at a temperature high enough to initiate regeneration across the normal generator load regime. The invention has instrumentation to measure the temperature of exhaust gas exiting the generator prime mover (the engine driving the generator), and the temperature of exhaust entering the DPF. Exhaust gas temperature provides a control input to an electronic computer which displays the temperature and outputs an electrical signal proportional to the exhaust gas temperature. The rate and amount of electrical power consumption on large yachts and other motor vessels is highly variable. This characteristic, in addition to the widely used practice of using a vessel's electrical generator prime mover as a source of power to drive a hydraulic pump, often leads to extended operation of the generator at low loads. Low loading of diesel powered generators creates a condition whereby poor combustion produces very high levels of exhaust emissions and the potential for accelerated wear of cylinder liners and piston rings.

The combination of those factors contributes to excessive soot production and the release of unburned hydrocarbons into the atmosphere and the water surrounding the vessel. While marine vessels are largely unregulated (at this time) with regard to diesel exhaust emissions, the practical impact of exhaust soot on the environment and the vessel's paintwork is unacceptable and is increasingly leading to restrictions being imposed on vessels that create a nuisance to their marina neighbors. Following the lead of automotive exhaust emissions remediation techniques, marine exhaust system manufacturers have developed and are installing diesel particulate filters (DPF) in the exhaust path to capture and oxidize soot and unburned hydrocarbons prior to their release into the atmosphere.

However, because the operational envelope of the marine vessel leads to underloading and hence to the problems described above, DPF systems often fail due to lack of regeneration and clogging. DPFs remove soot by trapping particles within a ceramic or metallic matrix that is coated with a catalyst to promote combustion of soot particles and unburned hydrocarbons. In order to begin combustion in a process known as "regeneration" the exhaust gases must reach a certain temperature. A diesel engine used to power a generator will normally produce exhaust gases at sufficient temperature when loaded at or near rated power output and the DPF will function effectively.

However, when generator loads are insufficient to produce exhaust flow at the required temperature, regeneration may not occur and filter clogging will quickly result. Filter clogging results in excessive exhaust back pressure, reduced output power, and may lead to serious engine damage.

The proportional heater controls a marine diesel engine emissions system coupled to a power generator set wherein a marine diesel engine is motively coupled to an electrical generator. The diesel engine exhaust is fed to a diesel particulate filter (DPF). The proportional heater control includes a heater disposed upstream of the filter. The heater is controlled by a heater control signal. An exhaust gas temperature sensor upstream of the filter generates signals which signals are fed to a controller which in turn generates a proportional heater control signal based upon the sensed temperature. In this manner, the controlled heater maintains the exhaust gas temperature at a point not less than a predetermined regeneration exhaust gas temperature during operation of the marine diesel engine electrical generator set. When the marine diesel engine is supplied with diesel fuel having a sulphur content exceeding 1,000 ppm and the diesel particulate filter has a base metal catalyst therein, the regeneration of the exhaust fumes removes soot and reduces sulphur content from the processed gas.

The exhaust gas temperature sensor is usually disposed upstream of the heater. The controller generates the proportional heater control signal to maintain the exhaust gas temperature within a predetermined temperature range which includes the predetermined regeneration exhaust gas temperature. The heater is supplied power by the generator and the controller applies proportional power to the heater via one or more silicon controlled rectifiers (SCR) based upon the exhaust gas temperature. The SCR controlled heater reduces or substantially eliminates electromagnetic and radio frequency interference by the controller. Multiple temperature sensors may be used for better control of the heater and for safety alarm limit detection.

A manual override control in the controller permits the user to input an exhaust temperature setpoint. In the override control mode, the controller generates the proportional heater control signal based upon the exhaust temperature setpoint and the heater establishes a load bank for the diesel engine electrical generator set.

BRIEF DESCRIPTION OF THE DRAWINGS

Further objects and advantages of the present invention are discussed later in the detailed description of the preferred embodiment when taken in conjunction with the accompanying drawings wherein:

FIG. 3 diagrammatically illustrates positioning of the heater within the exhaust system for the diesel engine.

DETAIL DESCRIPTION OF THE PREFERRED EMBODIMENTS

The present invention relates to a proportional heater control for diesel emission system for marine powered generator set. Typically, the marine diesel fuel has sulfur in a range of about 1500 ppm. With this concentrated level of sulfur, emissions from a diesel engine when the engine runs at idle or substantially no load or low load conditions include unacceptable amounts of soot, excess sulfur and sulfur products and the diesel emissions create an oil residue about the vessel when the vessel is docked. In summary, the present invention utilizes a control system and an inline exhaust gas heater which raises the temperatures of the exhaust gas to a regeneration temperature wherein the diesel particulate filter DPF which has a base metal catalyst therein causes the residue fuel in the exhaust gas to regenerate, burn and recombine and to alter the sulfur concentration in the exhaust gas to within governmental regulations. Similar numerals designate similar items throughout the drawings.

Figure 1:
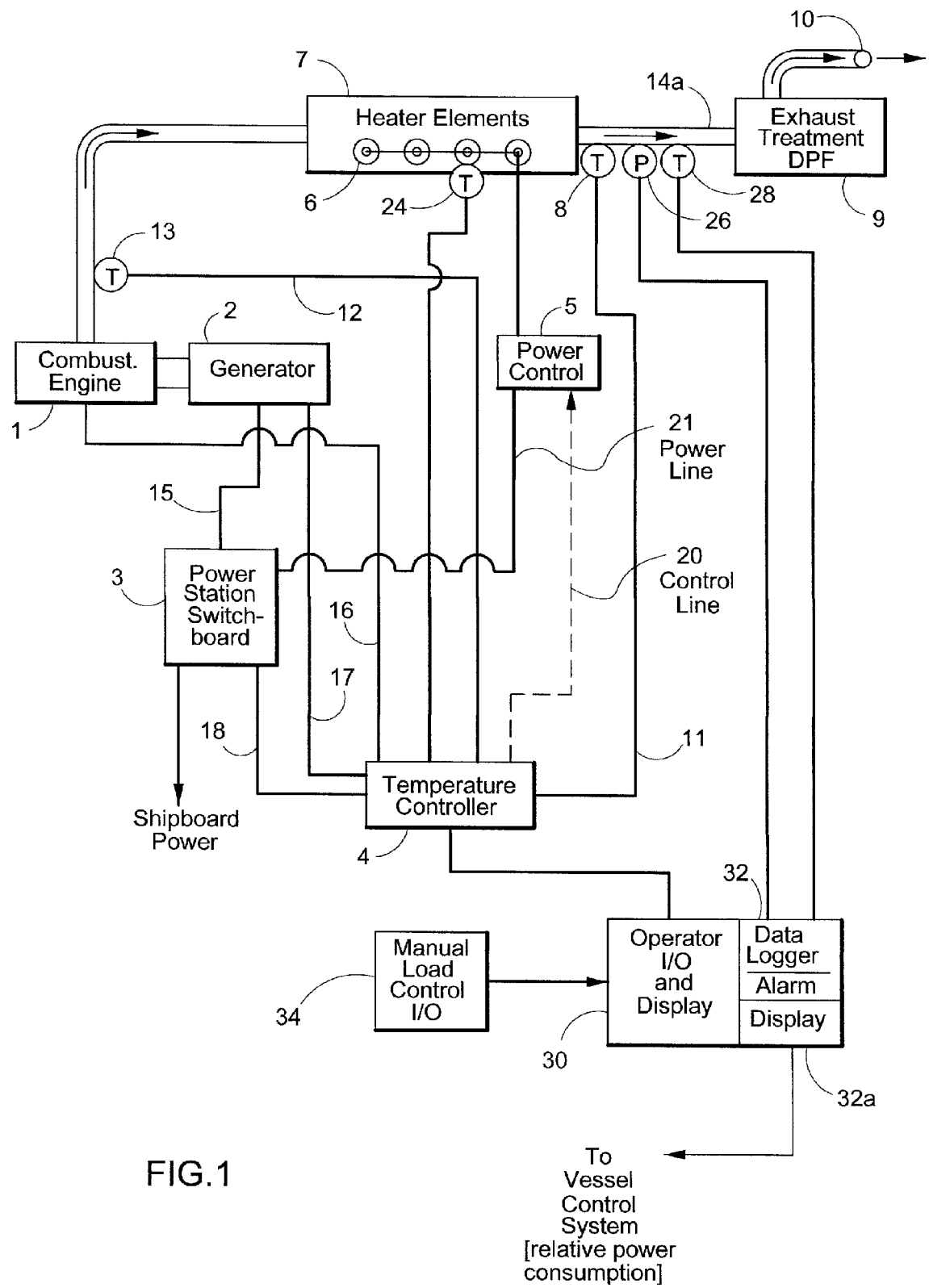
FIG. 1 diagrammatically illustrates the proportional heater control for the diesel emission system for the marine power generator set.

FIG. 1 diagrammatically illustrates the proportional heater control for diesel emission system for marine power generator set. Diesel combustion engine 1 has an exhaust port and exhaust piping 14 which leads to a heater system 7. Heater system 7 has a plurality of heater elements 6 therein. The exhaust gas passes through the inline heater element 6 and flows through exhaust pipe 14a to exhaust treatment filter which is a diesel particulate filter DPF. Ultimately, the treated exhaust gas exists the vessel at exhaust port 10. Temperature is monitored at the exhaust pipe 14 by temperature sensor T-13. Another sensor is mounted close to or on the heating element 6 as temperature sensor T-24. The gas output from the heater is measured at temperature sensor T-8. Safety temperature sensor T-28 and pressure sensor P-26 is also mounted in exhaust path or pipe 14a.

The diesel engine 1 is mechanically and motively connected to electrical generator 2. The output of electrical generator 2 is supplied via power line 15 to a power station switchboard 3. Some of the output from switchboard 3 is applied as shipboard power to the other electrical items on the vessel. Power switchboard 3 is also providing power on line 18 to temperature controller 4. Electrical generator 2 also has a control line 17 coupled to temperature controller 4. In the event of a power fuse or breaker activation, controller 4 is notified by a signal in line 17. Temperature controller 4 also monitors temperature an operating parameters of diesel engine 1 as noted by control line 16. The temperature controller 4 also receives temperature representative signals from temperature sensors T-13, T-24 and T-8 in the exhaust gas path.

Temperature controller 4 has a control output applying a control signal on control line 20 to heater power control 5. Power line 21 extending from power switchboard 3 to heater power control 5 also supplies power to the heater power control 5. As discussed later, power control 5 has a plurality of silicon controlled rectifiers (SCR) which SCRs apply proportional control power signal to heater elements 6 in heater 7.

Temperature controller 4 is coupled to operator input/output (I/O) and display 30. The operator input/output control 30 enables the operator to monitor the temperature controller as well as to monitor temperatures T-13, T-24 and T-8. Displays are provided as discussed later. The system also includes a user operable manual load control input/output 34. The operator input/output control 30 is also coupled to data logger 32 and alarm system. The data logger 32 has a display 32a. The data logger 32 is coupled to the vessel control system. As explained later, the data logger provides a relative power consumption signal which can be electronically supplied as a signal to the vessel control signal system. The data logger separately monitors pressure with sensor P-26 and temperature at sensor T-28 which are both coupled to or inside exhaust system 14a.

The controller 4 applies the following processes to control the power signal generated by the SCRs and applied to the heating elements 6 of heater 7.

Algorithm 1.0: If T-13<T-regenerate, then heater ON (proportional power control signal or "PPC" ON).

During normal operation and within normal operating parameters, the further process control is: Algorithm 1.1: If T-8>t-regenerate-Limit, then heater OFF (PPC).

If the system operator wants to maintain a certain load on the generator set, then the process is: Algorithm 1.2: If T-13, T-8<T-manual, then disregard T-regenerate, then heater ON (PPC).

Limit controls are applied, both on the heater elements 6 (Algorithm 2.0) and as a safety measure on the overall system ("max" levels).

Algorithm 2.0: If T-24>T-Limit-heater then power OFF (set by manufacturer).

Algorithm 3.0: If T-28>T-max-system, then heater OFF, alarm ON.

Algorithm 3.1: If P-26>P-max-system, then heater OFF, alarm ON.

Figure 2:
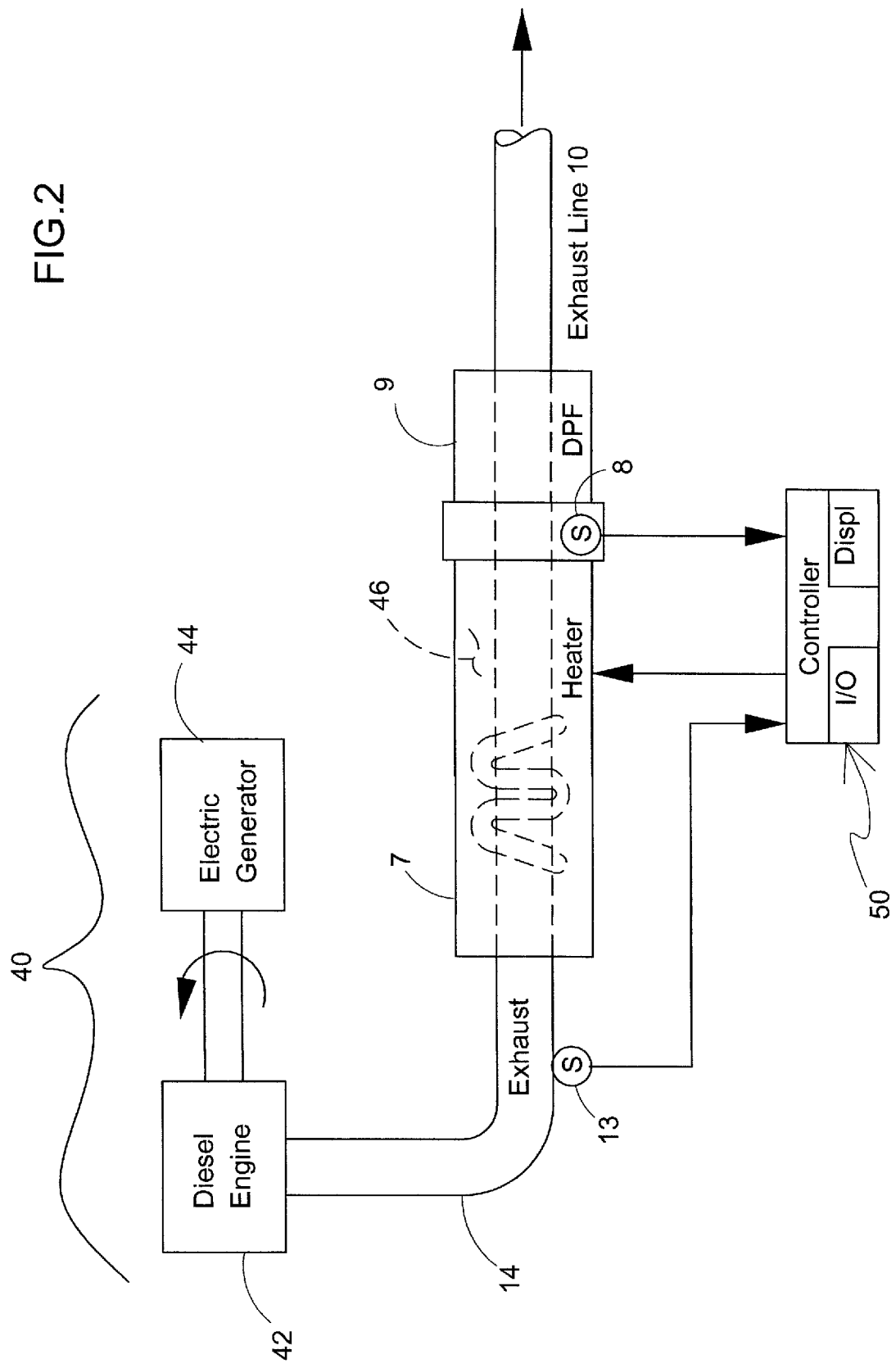
FIG. 2 diagrammatically illustrates major components of the proportional heater control.

FIG. 2 diagrammatically illustrates several major components of the present proportional control system. The electrical generator set 40 includes diesel engine 42 which is motively coupled to electric generator 44. Exhaust 14 from the diesel engine 42 is applied to the heater system 7 and then this heated exhaust gas is applied to DPF filter 9. Insulation 46 wraps around both heater 7 and DPF 9. A sensor 8 (similar to temperature sensor T-8 in FIG. 1), supplies a temperature signal to controller 50. An upstream temperature sensor 13 (see T-13) also supplies temperature signal to controller 50. Controller 50 includes input/output units enabling the user to make certain changes as well as a display unit. The process gas exists DPF 9 by exist line 10.

FIG. 3 diagrammatically shows certain mechanical aspects of the exhaust system. In FIG. 3, exhaust gas from the diesel engine is supplied to exhaust pipe 14. A heater 60 has a plurality of generally U-shaped heating elements 62. The outboard cap opposite heating element 62 provide the electronic control system and thermal isolation for the electronic power terminals. Exhaust gas entering exhaust pipe 14 passes over heating element 62 and then flows into DPF 9. The output of DPF 9 is applied to exhaust pipe 14a and ultimately the outlet of the vessel.

The following tables provide examples of typical operational parameters.

General System Parameters

Generator size-capacity 7 kw to 350 kw
Temp. range of full load 250 c to 700 c
DPF filter regeneration temp. 400-450 c Example of System Operating Parameters Generator: 170 kw
At partial load: T-8 approx. 250 c
Heater increase temp. T-8 to 450 c
Typical T-8 Temp. (no heater) 250 c to 750 c Operations In reference to FIG. 3, in one working embodiment of the present invention, the heater 62 is made up of multiple tubular resistance elements encased in high temperature resistant nickel alloy "hairpin" sheathing. The heater in the current embodiment is obtained from Watlow Electric Manufacturing Co. of St. Louis Mo. The terminal ends of the Watlow heater are reconditioned to handle temperatures within operating parameters described above, replacing epoxy and mica with a ceramic insulator poured into the terminal end shield. Other heaters from other manufacturers may have terminals operable within the described temperature ranges.

The hairpins are welded to a steel flange, the outside of which provides a terminal location. In one embodiment, the ends of the elements are sealed with ceramic to withstand continuous temperatures over 1000° C. or 2000° F. which is well below normal operating temperature. The heater is fitted with a thermocouple T-24 which measures the surface temperature of the element sheathing. The output of this temperature sensor T-24 is used as a safety input to the temperature controller 4. Should exhaust flow decrease for any reason while the heater is energized, this temperature safety feature will interrupt electrical power to the heating elements on reaching the limit setpoint to prevent damage to the heater or filter.

An alarm display on the I/O display 30 is provided in connection with the temperature controller 4 to indicate an "over temperature" shutdown. The loss of one or more heating elements 6 from normal use will reduce the total available heating capacity but will not render the heater 7 unserviceable.

In normal operation, the total wattage required to maintain filter regeneration can be supplied by less than the total number of heater elements 7 installed. It is unlikely that loss of one or two elements 7 would even be noticed.

The controller 4 manages the operation of the system and provides monitoring and display of exhaust gas temperature and backpressure. Pressure sensor 26 monitors the exhaust pressure between the heater and the DPF treatment system 9. The system controller contains a Temperature Controller 4, a Power Controller 5 (which conditions the power delivered to the heater 7), and a Data Logger and Alarm 32. Electrical power from the main power switchboard 3 is delivered to the Power Controller 5 through a pair of high speed SCR fuses (silicon controlled rectifiers). These specialized SCR fuses protect the Power Controller 5 in the event of a short circuit or other fault. The Temperature Controller 4 normally monitors and displays the temperature of the exhaust gas entering the filter body. Preferable, the temperature at sensor T-13 is used, but in another embodiment, the exhaust gas temperature after heater 7 may be used. Controller 4 is a multifunction device that can display the heater temperature T-24, the exhaust gas temperature T-14, percentage of power called for by system conditions (a relative power consumption signal and display based upon the post-heater exhaust gas temperature T-28) and the exhaust gas temperature T-8.

The SCR controlled heater reduces or eliminates electromagnetic and radio frequency interference associated with the prior art control systems.

Power delivered to the heater 7 may also be controlled manually by the engineer by a manual setting of exhaust gas temperature set point for the sensors at T-13 or T-8. The manual setting requires higher or lower generator loading than the programmed parameters. This manual setting above the programmed regeneration parameters allows the system to be used as a load bank for the engine generator set when conditions require additional loading. In this case, sheath temperature at T-24 becomes the limiting factor for how much power may be consumed by the system. If additional loading above the standard heater rating is required, larger capacity or even multiple heaters may be fitted to enhance the load bank capability of the system.

The Power Controller 5 modulates the amount of electrical energy delivered to the heater 7 and elements 6. The Power Controller 5 uses high speed silicon controlled rectifier (SCR) devices to switch power ON or OFF in proportion to a 4-20 mA signal from the Temperature Controller 4.

Power to the heater 7 is modulated smoothly by the Power Controller 5 in response to exhaust gas temperature changes. The rate of heater power increase and decrease is proportional to the rate of exhaust temperature change. As the vessel's electrical power consumption increases, the exhaust gas temperature also increases. The control signals from controller 4 are generally inversely proportional to the exhaust gas temperature at the exit port of engine 1, that is, at sensor T-13. Since the Diesel Particulate Filter (DPF) 9 performs best at high exhaust temperatures, high generator loads will normally supply exhaust hot enough that little to no electrical power is delivered to the heaters.

The net result of this relationship is that when the vessel requires maximum generator output, it is available without power being supplied to the heater 7. When vessel electrical requirements are low, the exhaust temperature is low and "excess power" is delivered to the heater 7 in order to increase exhaust temperature entering the particulate filter (based upon temperature at T-13 or T-8) so as to assure effective soot removal in addition to improving engine operation.

Unlike other systems which switch heaters ON and OFF to initiate filter regeneration, the present system smoothly varies the flow of power to the heater elements when and as required. There are no abrupt changes in generator power output and no chance of electrical overload. By not rapidly switching heavy electrical loads ON and OFF, the generator drive engine is allowed to smoothly increase or decrease power output without the familiar surge accompanied by flickering lights and a puff of black smoke. The system does not "rob" the vessel of electrical power that is required elsewhere.

The system includes a Data Logger 32 which records temperature T-28 and back pressure P-26 continuously while the system is in operation and will record up to 8000 hours of data. The data logger 32 is coupled to Temperature Controller 4 and processes the controller's signals to develop a heater power level signal which is stored in the logger memory. Data stored in the logger's non-volatile memory is used to evaluate system performance, confirm warranty conditions and help determine filter cleaning intervals. Software is provided with the system to enable the engineer to download and print performance records.

Pressure and temperature are displayed by LED displays in the I/O and Display 30. One embodiment shows one color LED light as the programmed set point and other LED color light showing the current operating temperature and pressure and power parameters. The pressure indication P-26 should be in the green range and change to yellow and finally red as backpressure reaches the high pressure alarm setpoint. A High Backpressure Alarm output 32, 32a is provided for connection to the vessel's central alarm and monitoring system.

Three-phase electrical power from the power switchboard 3 is delivered to the exhaust heating elements 7, 6 through an SCR Power Controller or Control 5. The SCRs switch the AC power to the heaters ON and OFF in proportion to a control signal from the Temperature Controller 4 in a variable time-based mode. For 50% power, the system supplies power ON for 3 cycles (for example) followed by an OFF period equivalent to 3 cycles. For 20% power, power is ON for 3 cycles and OFF for 12 cycles. The precision SCR electronics in controller 5 eliminates the electrical noise associated with switching high voltages and currents and the harmonics created by variable frequency controllers. Power surges caused by switching heavy loads on and off as happens with conventional load banks and other electrically regenerated particulate filters are eliminated by the power control mode of the present system. Power supplied to the heater is infinitely variable, it is smoothly applied or removed in proportion to system demand.

Since the marine diesel fuel has 1500 ppm sulphur, a precious metal catalyst will not work. Sulphur is effectively poisonous with precious metal catalysts.

One type of DPF filter which operates with the present control system is a DPF filter with a base metal catalyst made by Liqtech of Ballerup, Denmark. The DPF filter is specified to regenerate 1500 ppm sulphur diesel fuel exhaust gas. The DPF filter with a base metal catalyst is available from multiple sources. Other heaters are available from Chromalox of Pittsburgh, Pa.

A DCL DPF filter (described in the Background of the Invention) cannot work in this marine diesel environment because the precious metal catalyst cannot withstand the high sulphur content 1500 ppm of marine diesel fuel. The DCL cordierite catalyst operates on land-based systems with 15 ppm sulphur.

The sensors used in the present invention are PID sensors. PID sensors are used if the area being monitored has a type of explosive gases and uses catalytic or infrared sensors in the toxic atmosphere which is simultaneously monitored with the PID sensor. PID sensors are suitable for many different applications, e.g. monitoring work in shafts, closed rooms and confined spaces, leak and decontamination checks and controls.

The above description shows how an operator with ordinary skill in the art may practice the present invention. It is not intended to detail all obvious variations of the invention which will become apparent to a person of ordinary skill in the art. The claims appended hereto are meant to cover modifications and variations within the scope and spirit of the present invention.

The claims appended hereto are meant to cover modifications and changes within the scope and spirit of the present invention.

What is claimed is:

1. A proportional heater control for a marine diesel engine emissions system coupled to a power generator as a diesel generator set wherein a marine diesel engine is motively coupled to an electrical generator, said marine diesel engine having an exhaust system for its exhaust gas and a diesel particulate filter in said exhaust system, said generator set generating three phase AC power, the proportional heater control for marine generator set emissions system comprising:

a plurality of in-line heater elements disposed upstream of said filter in said exhaust system such that exhaust gas continually passes therethrough during engine operation, said heater elements controlled by a heater control signal;

an exhaust gas temperature sensor upstream of said filter in said exhaust system;

a controller, coupled to said temperature sensor and said heater elements, generating a proportional heater control signal based upon the sensed temperature from said sensor while the diesel engine is applying its exhaust gas to said filter;

wherein said heater elements are supplied three phase AC power by said electrical generator and the controller applies proportional three phase AC power to said heater elements via respective silicon controlled rectifiers (SCRs) based upon said exhaust gas temperature and increasing the diesel engine exhaust temperature due to increased engine loading based upon electrical power supplied to said heater elements from said electrical generator;

whereby the controlled heater elements maintain exhaust gas temperature not less than a predetermined regeneration exhaust gas temperature during operation of said generator set; and wherein the three-phase AC power from said electrical generator via said controller is delivered to said heating elements through said SCRs which switch AC power to respective heaters elements ON and OFF in proportion to said heater control signals from said exhaust gas temperature sensor in a variable time-based mode wherein power delivered by the SCRs substantially eliminates electrical noise associated with switching high voltages and currents and substantially eliminates harmonics created by variable frequency controllers and power surges caused by switching the generator set to heavy loads ON and OFF.

2. A proportional heater control as claimed in claim 1 wherein said temperature sensor is a first temperature sensor disposed in said exhaust system upstream of said heater elements, and the proportional heater control system includes a second temperature sensor disposed in said exhaust system intermediate said heater elements and said filter; said controller coupled to said first and second temperature sensors and providing said proportional heater control signal based upon the sensed temperatures from said sensors and said predetermined temperature range whereby exhaust gas temperature is not less than the predetermined regeneration exhaust gas temperature while the diesel engine is applying its exhaust gas to said filter.

3. A proportional heater control as claimed in claim 1 wherein said marine diesel engine is supplied with diesel fuel having a sulphur content exceeding 1,000 ppm and said diesel particulate filter has a base metal catalyst therein.

4. A proportional heater control as claimed in claim 1 including a data recorder coupled to said temperature sensor.

5. A proportional heater control as claimed in claim 1 wherein said exhaust gas temperature sensor is disposed upstream of said heater elements in said exhaust system.

6. A proportional heater control as claimed in claim 5 wherein said exhaust gas temperature sensor is disposed upstream of said heater elements in said exhaust system and said controller generates said proportional heater control signal to maintain said exhaust gas temperature within a predetermined temperature range which includes said predetermined regeneration exhaust gas temperature while the diesel engine is applying its exhaust gas to said filter.

7. A proportional heater control as claimed in claim 6 wherein said heater elements are supplied power by said generator and the controller applies proportional power to said heater elements via one or more silicon controlled rectifiers (SCR) based upon said exhaust gas temperature such that the SCR controlled heater elements reduces or substantially eliminates electromagnetic and radio frequency interference by the controller.

8. A proportional heater control as claimed in claim 7 wherein said temperature sensor is a first temperature sensor disposed in said exhaust system upstream of said heater elements, and the proportional heater control system includes a second temperature sensor disposed in said exhaust system intermediate said heater elements and said filter; said controller coupled to said first and second temperature sensors and providing said proportional heater control signal based upon the sensed temperatures from said sensors and said predetermined temperature range whereby exhaust gas temperature is not less than the predetermined regeneration exhaust gas temperature.

9. A proportional heater control as claimed in claim 8 wherein said controller has a manual override control permitting a user to input an exhaust temperature setpoint and said controller having an override control module which generates said proportional heater control signal based upon said exhaust temperature setpoint wherein said heater establishes a load bank for said generator set.

10. A proportional heater control as claimed in claim 9 wherein said marine diesel engine is supplied with diesel fuel having a sulphur content exceeding 1,000 ppm and said diesel particulate filter has a base metal catalyst therein.

11. A proportional heater control as claimed in claim 1 wherein said controller generates said proportional heater control signal to maintain said exhaust gas temperature within a predetermined temperature range which includes said predetermined regeneration exhaust gas temperature while the diesel engine is applying its exhaust gas to said filter.

12. A proportional heater control as claimed in claim 11 wherein the SCR controlled heater elements reduces or substantially eliminates electromagnetic and radio frequency interference by the controller.

13. A proportional heater control as claimed in claim 1 wherein said controller has a manual override control permitting a user to input an exhaust temperature setpoint and said controller having an override control module which generates said proportional heater control signal based upon said exhaust temperature setpoint.

14. A proportional heater control as claimed in claim 13 wherein said exhaust temperature setpoint is higher than said predetermined regeneration exhaust gas temperature and, with said manual override control, said heater establishes a load bank for said diesel engine electrical generator set.

15. A proportional heater control for a marine diesel engine emissions system, said marine diesel engine is supplied with diesel fuel having a sulphur content exceeding 1,000 ppm and coupled to a power generator set and motively coupled to an electrical generator as a diesel engine generator set, said marine diesel engine having an exhaust system for exhaust gas, and a diesel particulate filter with a base metal catalyst in said exhaust system, the proportional heater control for generator set emissions system comprising:
- a plurality of in-line heater elements disposed upstream of said filter in said exhaust system such that exhaust gas continually passes therethrough during engine operation, said heater elements controlled by a heater control signal;
- an exhaust gas temperature sensor upstream of said filter in said exhaust system;
- a controller, coupled to said temperature sensor and said heater elements, generating a proportional heater control signal based upon the sensed temperature from said sensor while the diesel engine is applying its exhaust gas to said filter;
- wherein said heater elements are supplied three phase AC power by said electrical generator and the controller applies proportional three phase AC power to said heater elements via respective silicon controlled rectifiers (SCRs) based upon said exhaust gas temperature and increasing the diesel engine exhaust temperature due to increased engine loading based upon electrical power supplied to said heater elements from the electrical generator;
- whereby the controlled heater elements maintains exhaust gas temperature not less than a predetermined regeneration exhaust gas temperature during operation of said generator set; and
- wherein the three-phase AC power from said electrical generator via said controller is delivered to said heating elements through said SCRs which switch AC power to respective heaters elements ON and OFF in proportion to said heater control signals from said exhaust gas temperature sensor in a variable time-based mode wherein power delivered by the SCRs substantially eliminates electrical noise associated with switching high voltages and currents and substantially eliminates harmonics created by variable frequency controllers and power surges caused by switching the generator set to heavy loads ON and OFF.

16. A proportional heater control as claimed in claim 15 wherein said exhaust gas temperature sensor is disposed upstream of said heater elements in said exhaust system and said controller generates said proportional heater control signal to maintain said exhaust gas temperature within a predetermined temperature range which includes said predetermined regeneration exhaust gas temperature.

17. A proportional heater control as claimed in claim 16 wherein said SCR controlled heater elements reduces or substantially eliminates electromagnetic and radio frequency interference by the controller.

18. A proportional heater control as claimed in claim 17 wherein said temperature sensor is a first temperature sensor disposed in said exhaust system upstream of said heater elements, and the proportional heater control system includes a second temperature sensor disposed in said exhaust system intermediate said heater elements and said filter; said controller coupled to said first and second temperature sensors and providing said proportional heater control signal based upon the sensed temperatures from said sensors and said predetermined temperature range whereby exhaust gas temperature is not less than the predetermined regeneration exhaust gas temperature.

19. A proportional heater control as claimed in claim 18 wherein said controller has a manual override control permitting a user to input an exhaust temperature setpoint and said controller having an override control module which generates said proportional heater control signal based upon said exhaust temperature setpoint wherein said heater elements establishes a load bank for said generator set.

20. A proportional heater control as claimed in claim 19 including a data recorder for said exhaust temperature.

* * * * *